Dec. 3, 1957     E. C. RHODES ET AL     2,815,282
NICKEL-MANGANESE-PALLADIUM BRAZING ALLOY
Filed May 27, 1954
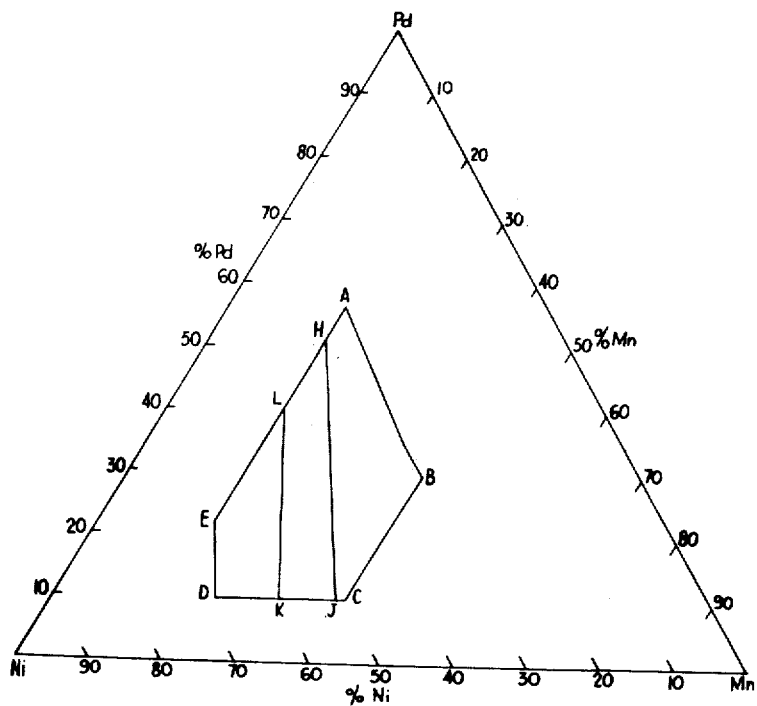
*Inventors*
*EDWIN C. RHODES*
*DAVID W. RHYS*
By
*Attorney*

2,815,282
NICKEL-MANGANESE-PALLADIUM BRAZING ALLOY

Edwin Clements Rhodes, Ealing, London, and David Wade Rhys, Hounslow, England, assignors to The International Nickel Company, Inc., New York, N. Y., a corporation of Delaware Application May 27, 1954, Serial No. 432,852
Claims priority, application Great Britain May 29, 1953
3 Claims. (Cl. 75—134)

The present invention relates to the art of joining metal parts, e. g., by soldering or brazing, which are subjected to high service temperatures, such as of the order of about 550° C. to about 850° C. and particularly to a brazing alloy for the joining of heat resistant chromium alloy members, such as members made of nickel-chromium or nickel-chromium-iron alloys, which may also contain cobalt, in the fabrication of structures such as structural gas turbine assemblies subjected in use to such elevated service temperatures.

It has heretofore been the practice to employ metal parts made of heat resistant alloys comprising chromium with nickel and/or cobalt as predominant elements with or without iron, titanium, aluminum, etc., as alloying ingredients. Such heat resistant alloys were used under conditions where considerable resistance to creep was required, such as, for example, in the making of blades for gas turbines. Under the conditions where resistance to creep was not so important, it has been customary to employ alloys wherein iron is the predominant element, such as the alloys commonly known as stainless steels which, as is well known, contain chromium. Such stainless steels were not adequate because as more powerful engines were designed, these steels did not have sufficient creep strength to withstand the high temperature conditions to which structural members of engines were subjected. While certain of the nickel-chromium alloys were found adequate as structural members in meeting some of the rigid requirements of gas turbines, special designs of structural members were generally resorted to in order to enable such parts to be sufficiently cooled during their use to prevent their overheating to temperatures at which resistance to creep was low. In attempts to overcome this difficulty, certain of the members were designed structurally as hollow parts, e. g., hollow turbine blades, and other structural shapes capable of being easily cooled. Such designs enabled the use of various types of chromium alloys, including nickel-chromium and nickel-chromium-iron alloys. However, in most instances, structural gas turbine sub-assemblies comprised of metal parts had to be produced by joining together a plurality of structural members by employing such joining means as soldering, brazing, etc.

The fabrication of structural gas turbine subassemblies by uniting together a plurality of chromium-containing alloy members presented joining problems due to the inherent tendency of the chromium-containing alloys, such as those containing titanium and/or aluminum, to produce a tenacious and substantially stable film of oxide on the surface near the area being joined which tended to interfere with the obtaining of a good sound joint, e. g., a lap joint, having the necessary high temperature properties to withstand the service conditions prevailing in gas turbines. The tenacious oxide film made joining of the heat resistant alloy members difficult in that the solder material employed would not always satisfactorily wet and flow over the oxide film, even when the joining was carried out in a reducing atmosphere, for example, hydrogen, and with the assistance of an active flux. In instances when the joining or soldering alloy had adequate wetting or flowing properties, it did not have the required combination of other important properties to enable it to be used in a joint under the aforementioned specified conditions. While the joining alloy had to have satisfactory wetting and flowing characteristics, it also had to have requisite strength, creep resistance and scaling resistance at elevated service temperatures of the order of about 550° C. to 850° C. Moreover, the joining alloy had to have a sufficiently high solidus temperature so that fusion of the joining alloy would not occur during service and in addition the alloy had to have a low enough liquidus temperature to enable the joining operations to be carried out without detriment to the alloy members being joined. Also it was desired that the liquidus and solidus temperatures be close together. For soldering nickel-chromium and nickel-chromium-iron alloys, it was required that the melting point of the solder should not be less than 900° C. nor more than 1250° C. It was also required that a joint, e. g., a lap joint, containing such a solder have adequate resistance to shear. Among the best soldering alloys employed at present for the purpose is a silver-palladium-manganese alloy containing 75% silver, 20% palladium and 5% manganese, as described in our U. S. Patent No. 2,654,946. While this alloy has been successful in meeting the needs of industry, recent developments of higher powered gas turbines have necessitated the development of a high strength solder having improved resistance to shear at elevated temperatures.

The mechanical properties of joints fall off as the temperature to which they are subjected in use approaches the melting point of the joining alloy used. In the aforesaid recent developments in gas turbine design the tendency has been for the operating temperatures to approach more nearly to the upper end of the aforesaid range of service temperatures of 550–850° C. Accordingly it is desirable that the melting point of the joining alloy should not be less than 1050° C.

Further, as is well known, the heat resistant alloys comprising chromium with nickel and/or cobalt as predominant elements with or without iron, titanium, aluminium etc., are commonly heat treated before being put into service in order to develop optimum mechanical properties. In many cases the benefit of this heat treatment is lost if the parts are reheated above 1150° C. after such heat treatment has been completed. Accordingly it is desirable for the best combination of properties in the joined assembly that the joining alloy should be capable of application at temperatures below 1150° C., i. e. the freezing point of the joining alloy should be 1150° C. or below.

Although attempts had been made to meet the foregoing requirements, to overcome the foregoing difficulties and to solve the problem of providing an improved soldering alloy for use in the production of high temperature structures having the requisite combination of properties and comprised of a plurality of members produced from alloys selected from heat resistant chromium-containing alloys, e. g. nickel-chromium and nickel-chromium-iron alloys, none, as far as we are aware, was entirely successful when carried into practice commercially on an industrial scale.

A soldering alloy has now been discovered having requisite wetting and flowing characteristics and also having improved mechanical properties at elevated temperatures, especially high resistance to shear. The special soldering alloy enables the production of improved gas turbine structures comprised of a plurality of high temperature chromium-containing alloy members united by one or more solder joints comprised of the special soldering or joining alloy.

It is an object of the invention to provide an improved soldering alloy characterized by improved resistance to shear at elevated temperatures when employed in a joint, said alloy having requisite wetting and flowing properties and having a melting point of not less than about 1050° C. nor more than about 1250° C.

A second object of the invention is to provide an improved soldering alloy characterised by improved resistance to shear at elevated temperatures when employed in a joint, said alloy having requisite wetting and flowing properties and having a melting point of not less than about 1050° C. and a freezing point of not more than about 1150° C.

Another object of the invention is to provide a method of successfully and satisfactorily soldering heat resistant, chromium-containing alloys, such as nickel-chromium and nickel-chromium-iron alloys, wherein the soldered joint is characterized by improved mechanical properties at elevated temperatures, particularly improved resistance to shear.

It is a further object of the invention to provide a fabricated structural gas turbine assembly comprised of a plurality of heat resistant chromium-containing alloy members united by a solder joint comprised of a special joining alloy, the joined portions of the members having an improved combination of properties at elevated temperatures as compared to joined portions produced with conventional joining alloys.

The invention also provides a fabricated gas turbine structure comprising members of a chromium-containing alloy, such as nickel-chromium and nickel-chromium iron alloys, united by one or more solder joints comprised of a special joining alloy, said structure being characterized by high mechanical strength, high creep resistance and by improved resistance to oxidation and to scaling at elevated temperatures of the order of about 550° C. to 850° C.

Still another object of the invention is to provide a fabricated gas turbine blade comprised of members of a chromium-containing alloy, e. g. nickel-chromium and nickel-chromium-iron alloys, united by one or more solder joints containing a special soldering alloy, said turbine blade being characterized by high mechanical strength and by improved resistance to creep, to oxidation and to scaling at elevated temperatures of the order of about 550° C. to 850° C.

The invention also contemplates providing a fabricated hollow blade structure for gas turbines comprising members of a chromium-containing alloy, such as nickel-chromium and nickel-chromium-iron alloys, united by a joint comprised of a special joining alloy, said hollow blade structure being characterized by high mechanical strength and by improved resistance to creep, to shear, to oxidation and to scaling at elevated temperatures of the order of about 550° C. to 850° C.

Other objects and advantages of the invention will become apparent from the following description taken in conjunction with the accompanying drawing which is a diagram of the ternary alloy of nickel, manganese and palladium showing areas which generally define compositions of the soldering alloy within the scope of the invention.

Generally speaking, the present invention contemplates an improved nickel, manganese and palladium joining or soldering alloy and an improved process of uniting parts or members of heat resistant, chromium-containing alloys, including nickel-chromium and nickel-chromium-iron alloys, with said joining alloy. The present invention also contemplates fabricated gas turbine structures and sub-assemblies, such as gas turbine blades, especially hollow blades comprising a plurality of parts or members united by one or more solder joints comprised of the special joining alloy, the melting point of the joining alloy being at least 1050° C. but not exceeding about 1250° C.

It has been discovered that by controlling the composition of the nickel-manganese-palladium alloy over the range of about 28% to 67% nickel, not less than 16% and up to about 40% manganese and the balance substantially palladium in amounts ranging from about 56% to 10%, a joining alloy is obtained having the requisite melting range of temperatures enabling its use in uniting heat resistant nickel-chromium and nickel-chromium-iron alloys at controlled temperatures which do not substantially adversely affect the heat resistant alloy being joined. The joining alloy is characterized by improved wetting and flowing properties when in contact with chromium-containing metals having a high tendency to form tenacious, stable oxide films at elevated joining temperatures, e. g. at soldering or brazing temperatures of the order of about 1050° C. and above.

The improved wetting and flowing properties of the alloys within the above composition range are due to a special co-operative effect of the palladium and the manganese when these are both present in the amounts indicated. It is believed that the palladium and manganese act jointly to break down the stable oxide film on the surface of the alloys containing chromium, and particularly those also containing titanium and/or aluminium, the palladium absorbing the cationic portion of such films and the manganese the anionic portion.

It is desirable in producing soldered joints comprising heat resistant nickel-chromium and nickel-chromium-iron alloys to employ a solder composition falling within the area bounded by A—B—C—D—E. It is preferred in carrying the invention into practice to employ a solder composition falling within the smaller area H—J—K—L. Of course it will be appreciated that small amounts of other elements may be present in the alloy without deleteriously affecting the properties of the joining alloy.

The nickel-palladium-manganese alloys of the invention are very strong and tough in addition to having good wetting and flowing properties. The alloy compositions falling with the area A—B—C—D—E melt between 1050° C. and 1225° C. The great advantage obtained by their use is that the resistance to shearing of parts joined by means of them is very high.

The alloy compositions falling within the area H—J—K—L melt at above 1050° C. and have freezing points not above about 1150° C. These alloys are therefore particularly suitable for use in joining those heat-resistant alloys which have been heat-treated to develop optimum mechanical properties and in which such properties are detrimentally affected by reheating above 1150° C.

An example of a solder that may be used to advantage in joining either alloys of the 80% nickel and 20% chromium type or austenitic stainless steels containing 18% chromium and 8% nickel is one containing 48% nickel, 31% manganese and 21% palladium. This alloy may be used for joining operations over the temperature range of 1120° C. to 1140° C. to produce heat resistant joints much stronger in shear at high temperatures than those produced with a prior joining alloy comprising about 75% silver 20% palladium and 5% manganese. The aforementioned alloy of the invention is compared to the prior alloy as follows:

| Test Temperature | Shear Strength—Long Tons per Square Inch | |
|---|---|---|
| | Prior Alloy | The Invention |
| 600° C | 4.1 | 25.0 |
| 700° C | | 19.5 |
| 750° C | 4.0 | 15.0 |
| 800° C | 3.0 | 11.2 |
| 850° C | 1.7 | 8.3 |

It will be noted that the foregoing table of results confirms the improved resistance to shear which is exhibited at elevated temperatures by the joining alloy provided by the invention.

The joining alloys provided by the invention can be worked into suitable shapes for soldering without great difficulty. This is advantageous because it is a common practice to form joining or soldering alloys into strips or the like which are used as fillets between the two parts to be joined together, and it is therefore convenient to be able to make these fillets easily.

The joining may be effected with a borax flux in a reducing atmosphere, preferably hydrogen. It is an advantage of the novel alloys that the clearance between the parts to be joined is not critical; not only do the alloys flow well through capillary openings but they will also fill larger openings while still providing joints having satisfactory mechanical strength. Accordingly with the alloys according to the invention it is not necessary, although naturally still desirable, that in preparing the surfaces to be joined these should mate with one another exactly.

Attempts to use ternary nickel-palladium-manganese alloys having compositions other than those of the alloys according to the invention encounter serious difficulties and disadvantages in addition to those already mentioned. Thus, those alloys lying to the right of the lines A—B and B—C in the drawing, i. e. those having too little nickel, are very difficult to work and can only be formed into shapes suitable for soldering with the greatest difficulty, if at all. Attempts to use such alloys in the form of powder have moreover led to joints which are subject to brittle failure. Alloys lying below the line C—D, i. e. those containing too little palladium, and those lying to the left of the line D—E—A, i. e. containing too little managanese, have inadequate strength at high temperatures in the range 550–850° C. Moreover, to the left of the line D—E the alloys have so high a melting temperature, i. e. above 1250° C., that their use as solders damages the parts they join together.

It is to be observed that the present invention provides a joining alloy and a method for the production of fabricated gas turbine sub-assemblies or structures made of parts of chromium-containing alloys, such as nickel-chromium and nickel-chromium-iron alloys, united by a joint comprised of the joining alloy containing nickel, manganese and palladium as essential elements, whereby the united metal parts or members can be successfully and satisfactorily used at high service temperatures of the order of about 550° C. to about 850° C.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. As a new article of manufacture, an improved joining alloy adapted for soldering heat resistant chromium-containing alloys intended for high temperature service of the order of about 550° C. to about 850° C. comprising about 28% to 67% nickel, not less than 16% and up to about 40% manganese and the balance essentially all palladium in amounts ranging from about 56% to 10%, the joining alloy having a melting temperature of not less than about 1050° C. nor more than about 1250° C.

2. As a new article of manufacture, an improved joining alloy adapted for soldering heat resistant chromium-containing alloys selected from the group consisting of nickel-chromium and nickel-chromium-iron alloys intended for high temperature service of the order of about 550° C. to about 850° C. comprising a nickel-manganese-palladium composition defined by the area A—B—C—D—E of the accompanying drawing, the joining alloy having a melting point falling within the range of about 1050° C. to 1225° C.

3. As a new article of manufacture, an improved joining alloy adapted for soldering heat resistant chromium-containing alloys selected from the group consisting of nickel-chromium and nickel-chromium-iron alloys intended for high temperature service of the order of about 550° C. to about 850° C. comprising a nickel-manganese-palladium composition defined by the area H—J—K—L of the accompanying drawing, the joining alloy having a melting point not less than about 1050° C. and a freezing point not more than about 1150° C.

References Cited in the file of this patent

UNITED STATES PATENTS

| | | |
|---|---|---|
| 2,133,291 | Gordon | Oct. 18, 1938 |
| 2,159,809 | Lenz et al. | May 23, 1939 |
| 2,226,079 | Spanner | Dec. 24, 1940 |
| 2,237,184 | Lemmers | Apr. 1, 1941 |
| 2,654,946 | Rhodes et al. | Oct. 13, 1953 |

FOREIGN PATENTS

| | | |
|---|---|---|
| 707,087 | Great Britain | Apr. 14, 1954 |
| 1,021,907 | France | Feb. 25, 1953 |

U. S. DEPARTMENT OF COMMERCE
PATENT OFFICE

CERTIFICATE OF CORRECTION

Patent No. 2,815,282            December 3, 1957

Edwin Clements Rhodes et al.

It is hereby certified that error appears in the printed specification of the above numbered patent requiring correction and that the said Letters Patent should read as corrected below.

Column 4, line 38, for "with" read --within--; column 6, line 48, list of references cited, under the heading "FOREIGN PATENTS" for "707,087" read --707,078--.

Signed and sealed this 25th day of March 1958.

(SEAL)
Attest:
KARL H. AXLINE
Attesting Officer

ROBERT C. WATSON
Commissioner of Patents